Feb. 23, 1971     S. D. RAINS     3,565,567
METHOD OF AND APPARATUS FOR MEASURING THE PRESENCE AND/OR
CONCENTRATION OF AN ELEMENT IN AN ATOMIC VAPOR
Filed June 25, 1968     4 Sheets-Sheet 1

STEPHEN D. RAINS
INVENTOR.

BY Charles C. Krawczyk

ATTORNEY

STEPHEN D. RAINS
INVENTOR.

BY Charles C. Krautzyk

ATTORNEY

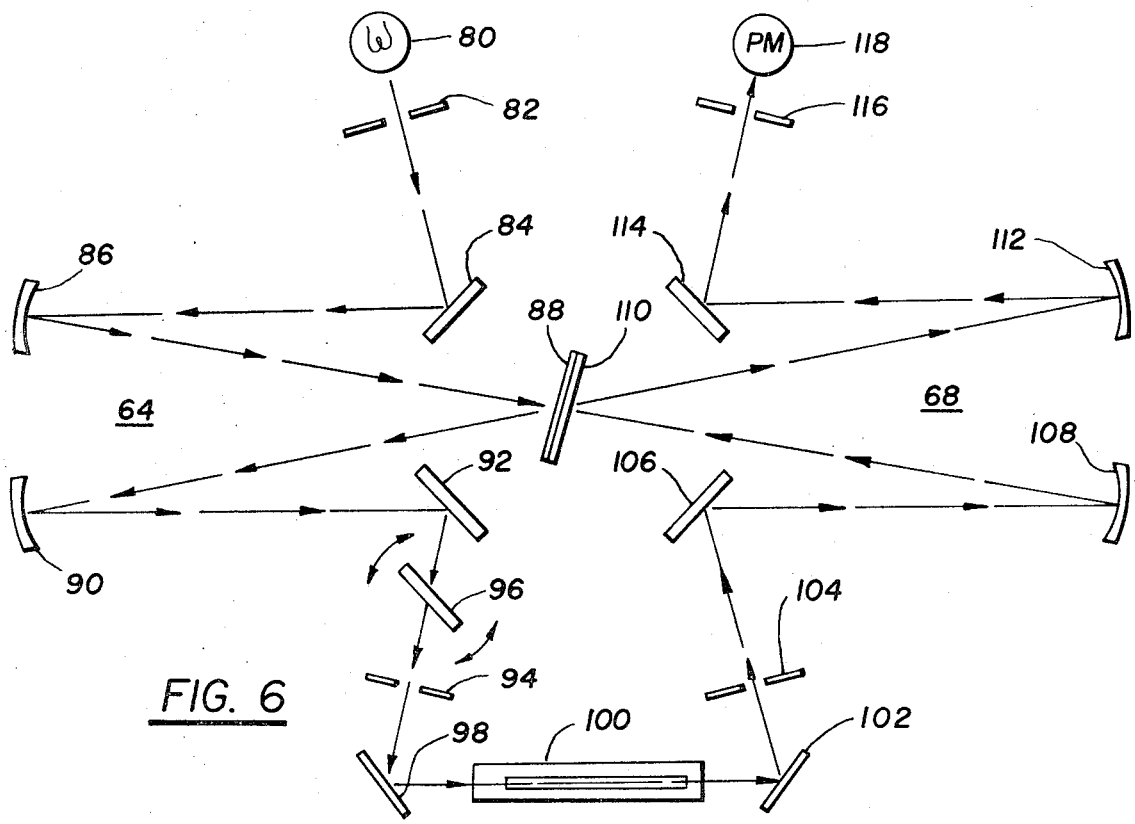
FIG. 6
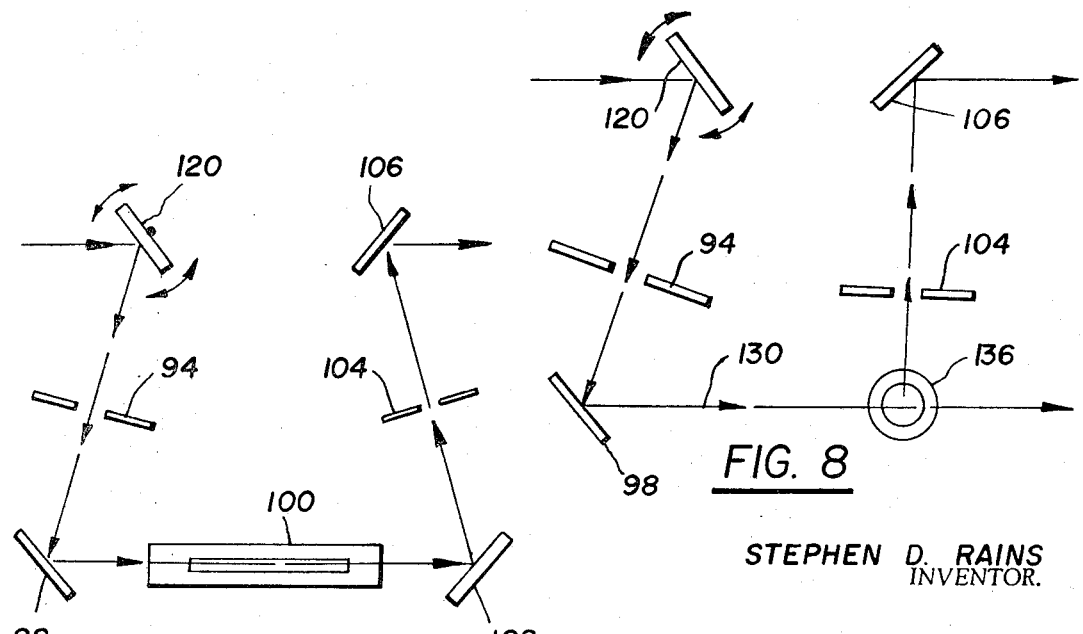
FIG. 7
FIG. 8
STEPHEN D. RAINS
INVENTOR.

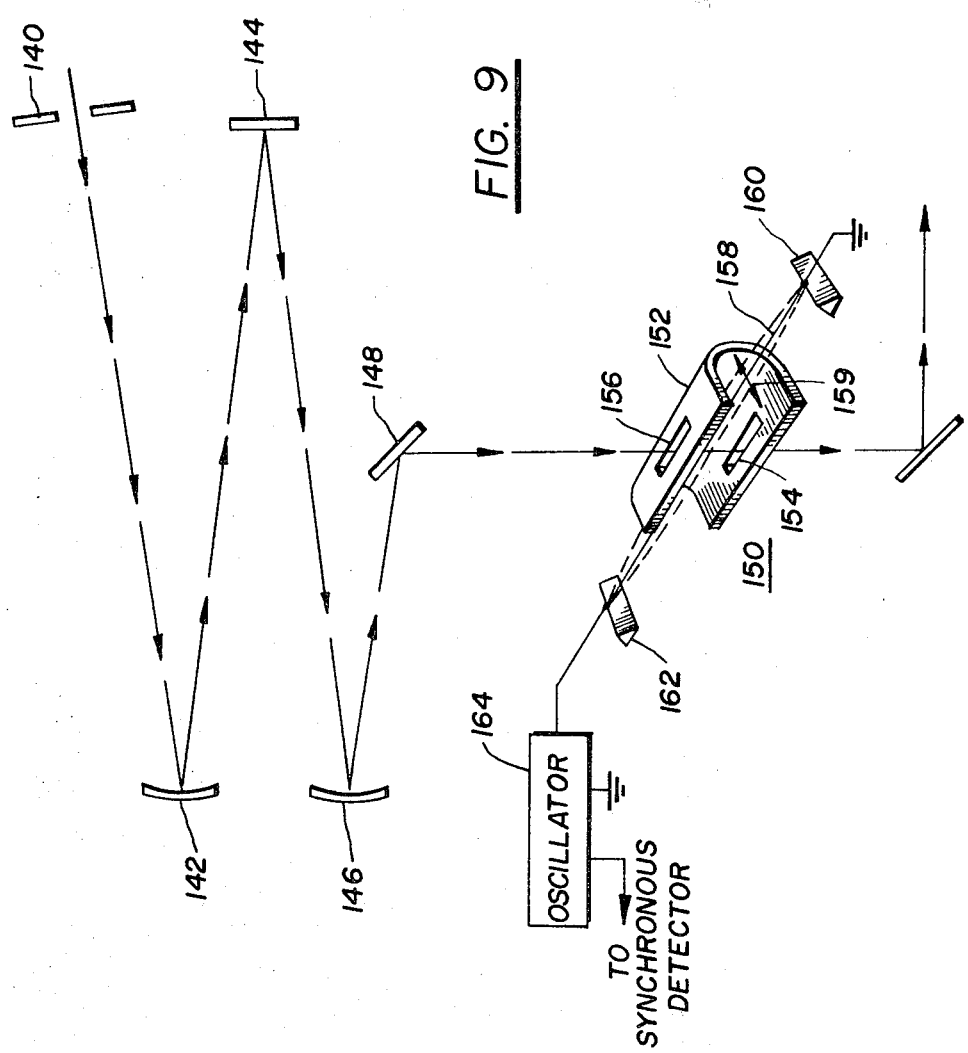

3,565,567
METHOD OF AND APPARATUS FOR MEASURING THE PRESENCE AND/OR CONCENTRATION OF AN ELEMENT IN AN ATOMIC VAPOR
Stephen D. Rains, Henrietta, N.Y., assignor to Bausch & Lomb Incorporated, Rochester, N.Y., a corporation of New York
Filed June 25, 1968, Ser. No. 739,853
Int. Cl. G01j 3/30, 3/12
U.S. Cl. 356—87                                              27 Claims

ABSTRACT OF THE DISCLOSURE

A beam of radiation from a continuum source is directed through an atomic vapor. A radiation sensitive detector monitors the radiation from the atomic vapor. A modulator is included so that the detector receives a wavelength modulated signal that periodically includes the wavelength of the spectral line characteristic of the element tested. The radiation sensitive detector generates a signal indicating the presence and/or concentration of the element by determining the amount of radiation absorbed, or the intensity of atomic fluorescence emitted.

BACKGROUND OF THE INVENTION

This invention relates to apparatus for spectrochemical analysis and more particularly to atomic absorption and/or atomic fluorescence spectrophotometers.

The presently available atomic absorption spectrophotometers are based upon apparatus disclosed in a U.S. Pat. No. 2,847,899 issued to Alan Walsh entitled "Method of and Apparatus for Spectrochemical Analysis." Such spectrophotometers require a spectral line radiation source, such as a hollow cathode lamp, emitting the atomic spectral line characteristic of the element being measured. The spectral line characteristic corresponds to the resonance energy required to cause a transition in an atom between two energy states. The substance being tested is converted into an atomic vapor by some excitation means, such as a flame. A beam of radiation from the spectral line source is directed through the atomic vapor and the amount of radiation absorbed by the atomic vapor provides an indication of the presence and/or concentration of the element in the substance. It should be noted that the sample may emit radiation having the same spectral line characteristic as that absorbed. The emission radiation is effectively rejected by the signal processing system by chopping or modulating the radiation from the source.

A spectral line source is required in the apapratus of the prior art since it is impractical and very expensive to design an instrument, such as a monochromator, to separate radiation from a continuum source into the spectral line characteristic of the element to be tested. Instead, a plurality of hollow cathode lamps are used to individually emit the atomic spectra of the various elements to be tested. In some cases more than one element is included in a single lamp to provide a source for measuring a plurality of elements. In order to be able to test for a large variety of elements a great number of hollow cathode lamps is required. This greatly increases the cost of the presently available systems. Furthermore, since the intensity of the source must be constant to provide accurate results, the lamps must be brought up to a "warm-up" condition to provide a stable output. As a result, such apparatus must include means for continuously energizing a plurality of lamps, for example, as disclosed in a copending patent application Ser. No. 617,103 filed for J. J. Chisholm and H. J. Emmel. In the system of the copending application, one of a plurality of preenergized lamps may be readily substituted into the system. The apparatus for continuously energizing a plurality of lamps increases the cost of the apparatus and also reduces the operating life of the expensive hollow cathode lamps. In any case, it would be highly impractical to provide apparatus for energizing a great number of lamps simultaneously thereby limiting the versatility of any such system. It would therefore be highly advantageous to provide a system that would include a continuum source that emits radiation over a wide range and be able to use this source for testing for a wide variety of individual elements.

Various studies have been made on the use of continuum sources for atomic absorption apparatus. One system was proposed wherein modulated radiation from a continuum source was directed through the atomic vapor and a very narrow band pass monochromator to a photodetector. The results were poor because the system relies on dispersion of the monochromator as the only mechanism for isolating from the continuum source that very narrow band of frequencies capable of being absorbed by an atomic vapor. The photodetector could not distinguish between radiation capable of being absorbed (spectral line wavelengths) and the non-absorbable radiation. In addition to the foregoing, since the system requires an extremely narrow band pass monochromator, the amount of available energy at absorbing wavelengths is small thereby resulting in a poor signal to noise ratio. The very narrow band pass monochromator also presents alignment problems when attempting to align its band pass with the spectral line characteristic of the element being tested.

In another approach, the material to be tested was pulsed into a flame at a periodic rate instead modulating the beam. In this system radiation from a continuum source was directed through the atomic vapor and a wide band pass monochromator to a photodetector. One problem encountered was the difficulty in pulsing the material into the excitation source at a fairly stable periodic rate so that synchronous detection can be employed to improve the signal-to-noise ratio. Although the pulsed sample system does distinguish between absorbable and non-absorbable radiation from the source, other difficulties are encountered. For example, flame emission radiation from the tested element interferes by off-setting a portion of the absorbed radiation thereby reducing the sensitivity of the system. The flame emission radiation by any other element in the sample will interfere with the measurement of the desired sample if the undesired element has an emission line within the band pass of the monochromator.

Furthermore, since molecular flame emission bands are much wider than atomic flame emission lines, interference can result if material producing molecular radiation is included in the tested sample, since they appear at the modulated frequency. The frequency or rate of sample pulsing is also limited to low frequencies in the order of 30 cycles. This also presents a problem since noise can be introduced into the system due to imperfections or inconsistencies in the sample pulsing. Band absorbance by the sample also causes a large error because, like molecular emission, such absorbance can occur over the entire band pass and will also be modulated. It would therefore also be advantageous to provide a system that uses a continuum radiation source and that is effectively insensitive to background (non-absorbing) radiation and/or molecular absorption and emission.

Another field related to atomic absorbance is atomic fluorescence. As previously mentioned, when an excited atom receives a photon of resonance energy, the photon of radiation is absorbed and an electron in the atom is raised to a higher energy level. The electron is unstable at this higher energy level, so the atom immediately returns to a lower energy state often by returning the electron to its original energy level and emitting a photon of radiation at the same resonance line wavelength. The radiation emitted from the atom due to the transition to the lower energy level is called atomic fluorescence. This fluorescent radiation is emitted in all directions. This is not the emission from the atomic vapor due to the initial excitation of the sample. It has been found that the presence and/or concentration of an element can also be measured by monitoring the atomic fluorescence of an atomic vapor.

Various studies have been made on atomic fluorescence wherein a beam of radiation from a line source or continuum source was chopped and subsequently directed through an atomic vapor. The energizing beam of radiation would then be directed into a light trap. A monochromator, adjusted to pass the wavelengths of interest (the spectral line characteristic of the element tested), would be positioned to receive atomic fluorescence without directly receiving the chopped beam. Since the atomic fluorescence occurs practically immediately, the atomic fluorescence will be modulated at the same rate as the beam. With these systems scattered radiation becomes a problem. Some of the modulated radiation from the source beam will be scattered from particles in the vicinity of the atomic vapor, and some of this scattered radiation will be received by the detector. Since the beam of radiation from the source and the atomic fluorescence are modulated at the same frequency, a detection circuit receiving the scatter radiation and the atomic fluorescence will not be able to differentiate between the two. As a result, scatter light will be a direct error. In the case of the conventionally modulated continuum source, the additional presence of the wide range of wavelengths makes it more difficult to achieve sufficient specificity.

It is therefore an object of this invention to provide new and improved methods and apparatus for measuring the presence and/or concentration of elements in an atomic vapor using a continuum source of radiation.

It is also an object of this invention to provide new and improved methods and apparatus for measuring the presence and/or concentration of elements in an atomic vapor using wavelength modulation.

It is still a further object of this invention to provide a new and improved method and apparatus for measuring the presence and/or concentration of elements in an atomic vapor using a continuum source to measure the amount of radiation absorbed by the atomic vapor that is effectively insensitive to radiation emitted by said vapor.

It is also an object of this invention to provide a new and improved method and apparatus for measuring the presence and/or concentration of elements in an atomic vapor by measuring the amount of atomic fluorescence.

It is also an object of this invention to provide a new and improved method and apparatus for measuring the presence and/or concentration of elements in an atomic vapor by using a continuum source to measure the amount of atomic fluorescence emitted by the atomic vapor that is effectively insensitive to scatter radiation.

SUMMARY OF THE INVENTION

The method and apparatus of the invention uses wavelength modulation i.e. a beam of radiation varying in wavelength content, to differentiate between the desired radiation and undesirable radiation from an atomic vapor and/or radiation from a radiation source. The beam of radiation is wavelength modulated over a range to periodically include and exclude the spectral line of the element being tested and no interfering spectral lines. A radiation sensitive detector receives modulated radiation and provides a signal indicating the presence of the element tested in the atomic vapor.

A further feature of the invention includes circuit means for converting the signal into a signal corresponding to the concentration of an element in the atomic vapor.

In a first embodiment, the modulation means is positioned between the atomic vapor and the detection means to receive a beam of radiation from a continuum source after it passes through the atomic vapor to measure the amount of spectral line absorption.

In a second embodiment, the modulation means is positioned between a continuum source and the atomic vapor. A filter means is positioned between the atomic vapor and the detection means to receive said wavelength modulated beam to pass the modulated range of wavelengths to the exclusion of others to measure the amount of spectral line absorption.

In a third embodiment, the modulation means is positioned between the source and the atomic vapor. The filter is positioned between the atomic vapor and the detection means to receive radiation from the vapor to the exclusion of said modulation beam to measure the amount of atomic fluorescence emitted.

BRIEF DESCRIPTION OF THE DRAWINGS

FIG. 6 is an expanded schematic diagram of the system of FIG. 2.

FIG. 7 is a modification of the system of FIG. 6.

FIG. 8 is an expanded schematic diagram of a portion of the system of FIG. 3.

FIG. 9 is a schematic diagram of another embodiment of a wavelength modulator for use with the systems of FIGS. 1–8.

DESCRIPTION OF THE PREFERRED EMBODIMENT

In the systems of FIGS. 1–8, the source of radiation is a continuum source i.e. a lamp that provides a substantially continuous wide range of wavelengths such as that emitted by xenon, tungsten, and deuterium lamps and the continuum range is designated as a first range of wavelengths. This wide range of wavelengths includes the wavelengths of the characteristic spectral lines of most elements. By characteristic spectral line reference is being made to the wavelength absorbed and/or emitted by an atom of an element when changing from one energy state to another energy state, i.e. a resonance line. In the case of atomic absorption apparatus the substance being tested is converted into an atomic vapor by some means, usually a flame. The atomic vapor absorbs and emits radiation corresponding to the spectral lines of the various elements contained within the substance.

Figure 1:
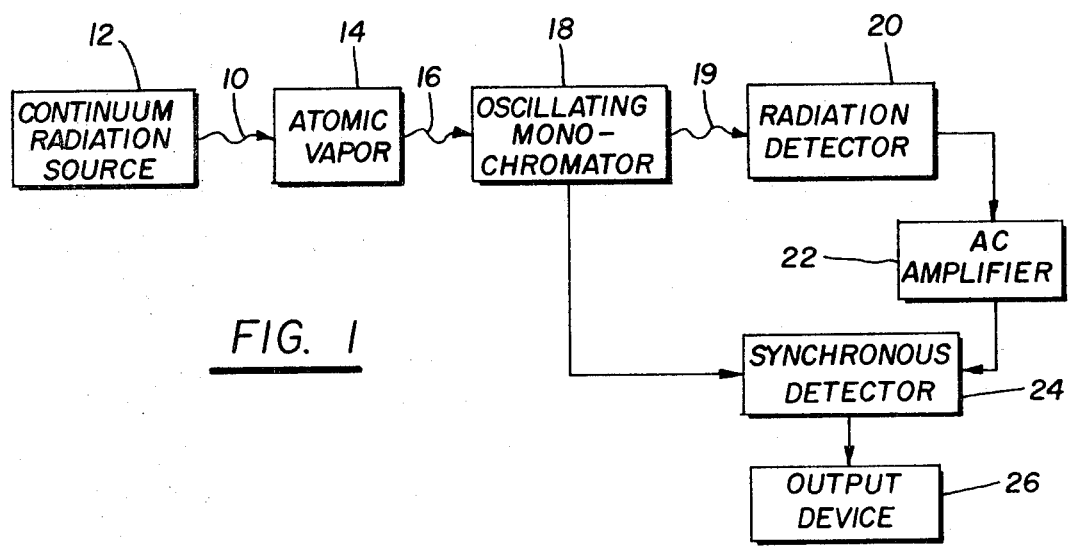
FIG. 1 is a block diagram of a first embodiment of the apparatus including the principles of the present invention for measuring atomic absorption.

In the block diagram of FIG. 1 a beam of radiation 10 including the continuum range of wavelengths is directed from a continuum source 12 through an atomic vapor 14. It is well known that the amount of radiation that is absorbed by the atoms in the atomic vapor depends upon the concentration thereof and that the amount of radiation absorbed along the direction of the beam of radiation exceeds that emitted along the same direction by fluorescence or the atoms in the vapor. Accordingly, a beam of radiation 16 emerging from the atomic vapor is decreased in intensity along the spectral lines of the atomic elements within the atomic vapor. Here absorption has occurred.

The beam of radiation 16 is received by an oscillating monochromator 18 which transmits a wavelength modulated narrow band width beam 19 to a radiation detector 20. In effect, the oscillating monochromator functions as a variable narrow band pass filter. By band width reference is being made to the number of wavelengths within the beam i.e. the wavelength content. By narrow, reference is being made to narrow relative to the spectrum of wavelengths from the source 12, but wide relative to the absorbing line of an element (designated as a second band width or range of wavelengths). The wavelength content is rapidly varied over a small range to periodically include and exclude, within the band width, radiation corresponding to the spectral line characteristic of the element being tested (designated as a third or oscillating range of wavelengths).

The oscillating range is large enough to periodically include the spectral line of interest of the element tested and to exclude interfering absorption lines. By excluding interfering absorption lines, it is intended that the oscillating range includes only the absorption line of the element to be tested, several absorption lines in addition to the desired absorption line but of the type that will not interfere with the test, such as (1) absorption lines that provide much smaller signal levels than the absorption line of interest, or (2) an element that is unlikely to be found in the same sample as the desired element. For example, if the concentration of a relatively rare element must be in the order of a thousand times that of another element before a measuring problem occurs, the two elements are not considered to be interfering. Furthermore, if an element that will interfere with the analysis of other elements, even if present in minute quantities, but is extremely rare or very short lived so that the presence of such an element is highly unlikely, such an element is not considered an interfering element.

The oscillating monochromator 18 may, for example, have two wavelength adjusting or varying devices. The first device, such as a radiation dispersing device (as a grating or prism) is variable over a wide range in the order of that of the radiation source (defined as a fourth or dispersing range of wavelengths), to select a portion of the spectrum of radiation of the source to be transmitted i.e. a nominal band of wavelengths. The second device includes means for periodically varying the wavelength contents of the beam at a rapid rate. In effect, the output of the monochromator will be a wavelength modulated beam of radiation, having a substantially constant band width, but varying in wavelength content to periodically include the wavelengths suitable for atomic absorption i.e. absorbing radiation. The oscillating range (third range), however, is small compared to the overall dispersing range of wavelengths of the monochromator (fourth range) but large enough so that it periodically simultaneously transmits both absorbing radiation and non-absorbing radiation while at other times only transmits non-absorbing radiation. The dispersing device is first appropriately positioned to discriminate against all wavelengths from the source except that within its band pass, at or near, the absorbing wavelengths. The monochromator 18 can continuously oscillate through a range of wavelengths centered about a spectral line or can be stepped or pulsed between two bands of wavelengths in discrete steps, one of which includes the spectral line.

If the monochromator does not transmit the wavelength of the absorbing radiation (spectral line of the element under test), the amount of or intensity of the radiation received by the detector remains substantially constant. On the other hand, if the oscillating range wavelengths periodically includes the spectral line characteristics of the element, the amount of radiation received by the detector 20 is periodically reduced by the amount of radiation adsorbed in the atomic vapor. Accordingly, it can be seen that a periodic signal is generated by the detector 20 that has a periodic rate proportional to the oscillating rate of the monochromator 18 and has an amplitude that is a function of the amount of spectral line radiation absorbed, which in turn is related to the concentration of the element in the atomic vapor.

The periodic signal is amplified by an alternating current (AC) amplifier circuit 22 and applied to a synchronized detector circuit 24. The synchronized detector circuit 24 receives a "sync" pulse from the oscillating monochromator 18 and provides a signal to an output indicating device 26 for indicating the presence and/or concentration of elements in the atomic vapor 14. The synchronized detector 24 circuit is used to provide an improved signal-to-noise ratio and is well known in the art requiring no further explanation.

Figure 4:
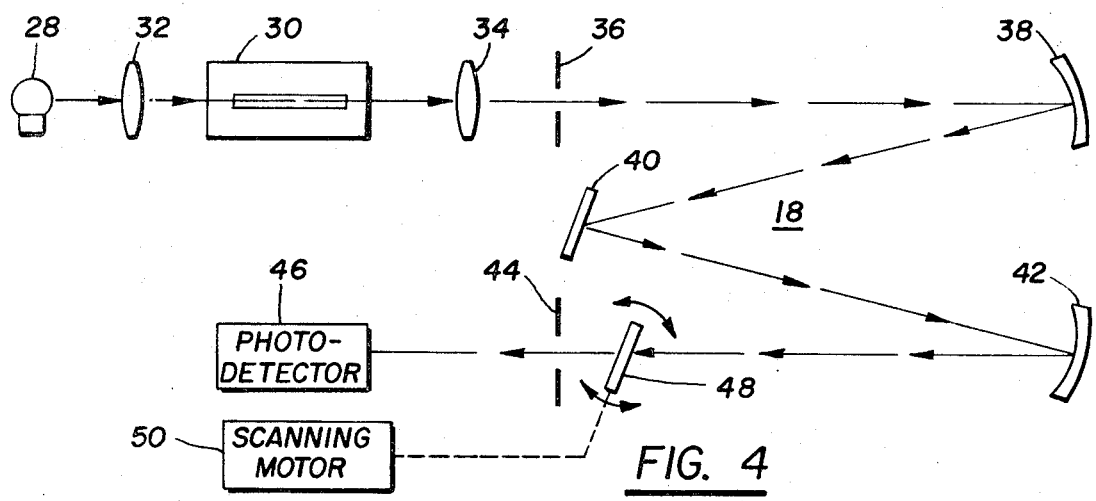
FIG. 4 is an expanded schematic diagram of the system of FIG. 1.

In the expanded schematic diagram of FIG. 4, a beam of radiation from a continuum lamp 28 is directed through the flame of an elongated burner 30 by a focusing lens 32. The radiation passing through the flame is directed by a second focusing lens 34 through the entrance slit 36 of the oscillating monochromator 18. The beam of radiation passing through the entrance slit is reflected by a collimating mirror 38 towards a dispersing device, such as a rotatable optical grating 40. The beam of radiation is dispersed in various directions in accordance with wavelength and is directed by an objective mirror 42 towards an exit slit 44. A photodetector 46 is positioned to receive the band of wavelengths passing through the exit slit 44. The size of the exit slit 44, the angle of dispersion, the focal length of objective mirror 42, and the size of entrance slit determine the band pass of the monochromator, generally defined in angstroms (A.). The number of wavelengths in the spectrum leaving the exit slit 44 is the band width of beam of radiation.

A quartz plate 48 is positioned in the beam before the exit slit 44 and is oscillated back and forth over an angle in the order of 20° to refract the radiation passing therethrough to scan the dispersed radiation past the slit 44. This cyclically varies the wavelength content of the beam width of the transmitted beam to effectively provide wavelength modulation. When testing for a given element, the grating 40 is first rotated so that the absorbing and adjacent band wavelengths are dispersed through or adjacent to the exit slit 44. The quartz plate 48 periodically scans a band of wavelengths (oscillating range) to transmit wavelengths including only one of the spectral lines of elements in the atomic vapor or material to be tested.

Figure 5:
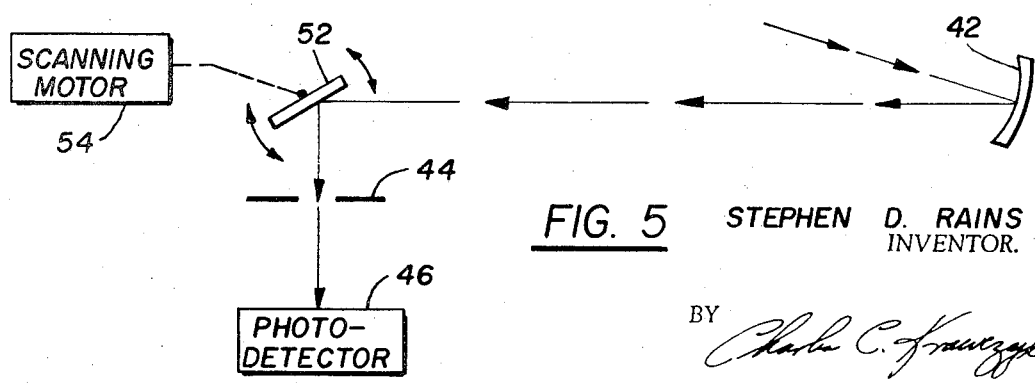
FIG. 5 is a modification of the system of FIG. 4.

In the embodiment of FIG. 5 the quartz plate is replaced by an oscillating mirror 52 driven by a motor 54. The dispersed beam of radiation received by the objective lens 42 is directed toward the exit slit 44 by the oscillating mirror 52.

As previously mentioned in reference to FIG. 4, the photodetector 46 generates a substantially constant signal until the spectral line is passed through the exit slit 44. At this time the intensity of the light beam is reduced by an amount absorbed by the atomic vapor. The signal generated by the photodetector 46 can be described as a constant amplitude direct current signal (with irregularities due to noise) with a superimposed periodic signal component (a recurring sharp dip) at the modulation frequency. The amplitude of the periodic signal component is directly related to the concentration of the tested element in the atomic vapor. An AC amplifier 22 effectively rejects the direct current component and amplifies and translates the periodic signal component and noise signals to a synchronous detector 24. The synchronous detector 46 monitors the periodic signal component and any translated noise to produce a direct current signal that is effectively insensitive to noise. With a wide band pass in the monochromator 18, a greater amount of energy can be transmitted to the detector 20 thereby providing a higher signal-to-noise ratio than that provided with the narrow band pass monochromators of the prior art. Furthermore, a wide band pass monochromator is less expensive than a narrow band pass monochromator providing an added economic advantage over the prior art.

Figure 2:
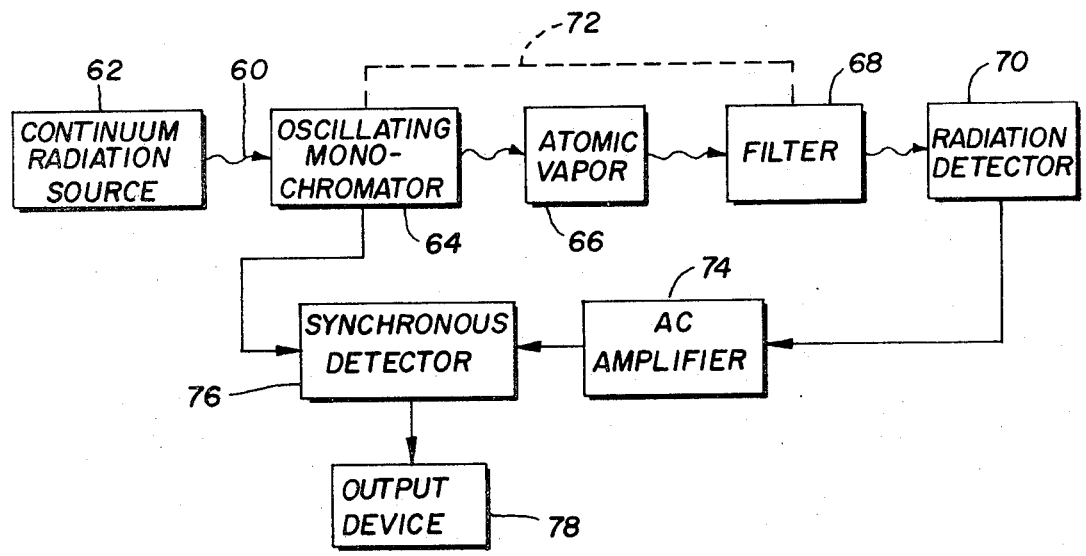
FIG. 2 is a block diagram of a second embodiment of the apparatus including the principles of the present invention for measuring atomic absorption.

In the system of FIG. 2, a beam of radiation 60 is directed from a continuum source 62 through an oscillating monochromator 64 toward an atomic vapor 66. The oscillating monochromator 64 functions as a variable filter having a narrow band pass (second range of wavelengths) to selectively pass an oscillating range of wavelengths (third range of wavelengths) periodically including the spectral line of the element being tested. The radiation passing through the atomic vapor 66 is directed through a filter 68 to a detector 70. The filter 68 is a narrow band pass filter capable of passing at least the oscillating range (third range) of wavelengths passing through the monochromator 64. For example, if the oscillating monochromator 64 oscillates over a range of wavelengths of 20 A., the filter 68 should pass at least the 20 A. scanned. The output from the detector 70 is amplified by an AC amplifier 74 and applied to a synchronous detector 76 receiving a "sync" pulse from the oscillating monochromator 64. The detector circuit 76 applies a signal to an output device 78 corresponding to the presence and/or concentration of an element being tested.

In the expanded schematic diagram of FIG. 6, radiation from a continuum lamp 80 is directed through an entrance slit 82, of a first monochromator that functions as the oscillating monochromator 64. The radiation received is reflected by a plane mirror 84 and directed by a collimating mirror 86 towards a first dispersing element or grating 88. The dispersed beam of radiation is directed by an objective mirror 90 towards a plane mirror 92 which directs the dispersed radiation towards an exit slit 94. An oscillating quartz plate 96 is positioned between the mirror 92 and the exit slit 94 to periodically vary the wavelengths passed through the exit slit 94.

The band of wavelengths passing through the exit slit 94 is directed by a spherical mirror 98 through a flame of a burner 100 for absorption. The radiation passing through the flame is directed by a spherical mirror 102 through an entrance slit 104 of a second monochromator that functions as the filter 68 (FIG. 2). The radiation passing through the exit slit 104 is reflected by a plane mirror 106 towards a collimating mirror 108 which in turn reflects the beam on a second dispersing device or grating 110. The redispersed radiation from the grating 110 is directed toward an objective mirror 112 which redirects the radiation toward a plane mirror 114 for reflection towards an exit slit 116. The band of wavelengths passed by the exit slit 116 is received by a photomultiplier 118. The system of FIG. 7 is similar to that of FIG. 6 except an oscillating mirror 120 scans the dispersed radiation from the grating 88 past the exit slit 94. It should be noted that the gratings 88 and 110 are mounted back to back so that the gratings can be rotated together and the monochromators can be mechanically coupled to sweep the range of wavelengths from the lamp 80 in unison.

Both the systems of the FIGS. 1, 2, and 4–7 have the advantages of rejecting non-absorbing and background radiation. The non-absorbing and background radiation appears as substantially constant signals which are rejected by the AC amplifier. The double monochromator system of FIGS. 2, 6, and 7 has an added advantage over the systems of FIGS. 1, 4, and 5 in that the system is insensitive to emission radiation. By varying the wavelength of the radiation directed through the atomic vapor (oscillating monochromator 64) the absorbed radiation (reduction in intensity) appears as an AC signal while the emission signal appears as a substantially constant DC signal. The AC amplifier 74 effectively rejects the emission signal. Any effect of random fluctuations in the emission, non-absorbing and background radiation is further minimized by the use of the synchronous detector circuit 76.

When using the systems of the figures, the oscillating monochromators 18 and 64 are first preset to pass a beam of radiation whose band width includes the spectral line of the element to be tested and the filter is selected to pass the oscillating range of wavelengths. As previously mentioned, the filter 68 can be a monochromator or fixed narrow band pass filter that passes the oscillating range of wavelengths and excludes wavelengths beyond the oscillating range to provide filtering of background radiation. The oscillating monochromators vary the wavelength content within the band width of the transmitted beam to periodically include the spectral line of the element. The oscillating motion of the mirrors or quartz plate may be sinusoidal motion to continuously transmit a range of wavelengths periodically include the spectral line, or a pulse or step type motion to rapidly switch between two wavelength bands, one of which includes the spectral line. The scanning or oscillating rate is optional although a high scanning rate such as 200 cycles per second is preferred to simplify the separation of the AC or modulated signal from the unmodulated signal and noise.

It is advantageous to provide as great a band pass as possible for the oscillating monochromators. Although the wider pass permits a wider range of wavelengths to pass, it also permits more energy at any single wavelength to pass. With more energy at the spectral line available, more radiation will be absorbed resulting in a higher amplitude of modulated or AC signals. This greatly improves the signal-to-noise ratio of the system. The band pass of the monochromator should be as wide as possible, but should be considered along with the oscillating range. The oscillating range should be great enough to periodically exclude the spectral line of the element, but should not encompass a range of wavelengths wherein the spectral line of an interfering element appears. Successful results have been achieved by using a band pass of 5 A. and an oscillating range of 20 A. The band pass of filter 68 of FIG. 2 should be adequate to pass substantially unattenuated the entire oscillating range of wavelengths transmitted by the oscillating monochromators (20 A.) and still provide sufficient filtering of background radiation.

In the apparatus of the invention, a low resolution, wide band pass, and low cost monochromator can be used in the systems as compared to the very narrow band pass monochromator of the prior art. The systems can quantitively measure the amount of concentration of an element present by oscillating at the wavelengths of interest, or can simultaneously make qualitative and quantitive measurements by sweeping through the entire spectrum of the monochromators while continuously oscillating to monitor each spectral line present in the atomic vapor. The systems of FIGS. 2, 6, and 7 have the advantage of providing a higher degree of accuracy since the effect of emission radiation is eliminated.

Figure 3:
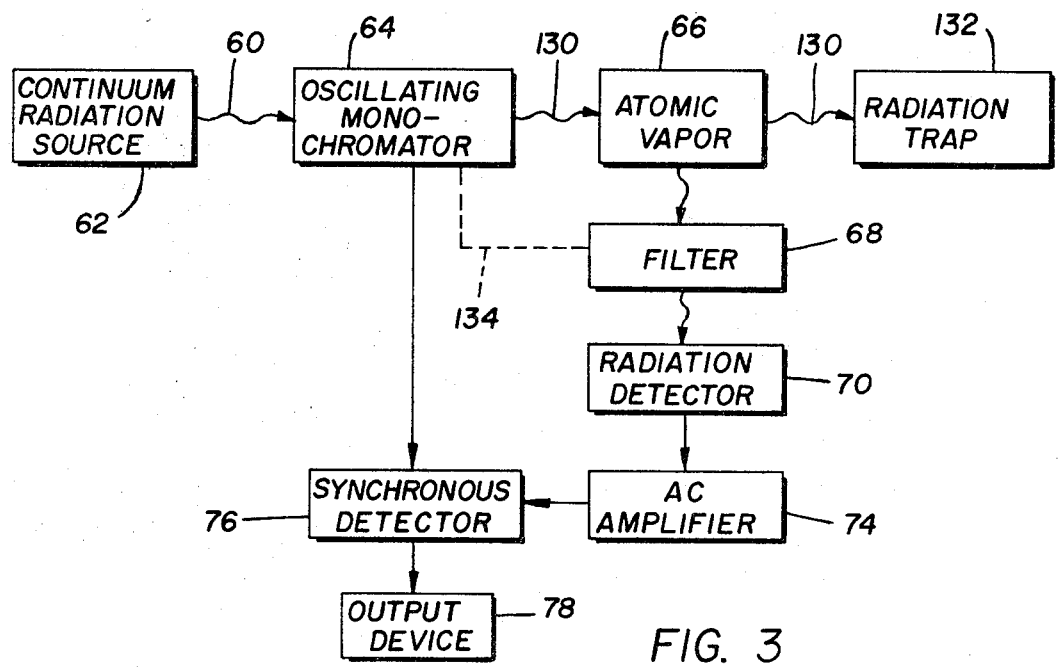
FIG. 3 is a block diagram of a third embodiment of the apparatus including the principles of the present invention for measuring atomic fluorescence.

FIG. 3 is the third embodiment of the invention disclosing a system used to measure atomic fluorescence. The same reference numerals are used in FIGS. 3 and 8 to designate the same components as in FIGS. 2, 6, and 7. The beam of radiation 60 is directed from the continuum radiation source 62 towards the oscillating monochromator 64. The oscillating monochromator 64 functions as a variable filter having a narrow band pass compared to the spectrum of the source 62 to selectively pass a beam of radiation 130 through the atomic vapor 66 that periodically includes the spectral line of the element being tested. The oscillating monochromator 64 functions in the same manner as that described in FIG. 2. The beam of radiation 130 after leaving the atomic vapor is directed to a radiation trap 132.

As previously mentioned, when an atomic vapor is irradiated with the spectral line radiation characteristic of an element in the atomic vapor, a portion of the beam of radiation (energy corresponding to the atomic spectral wavelength) is absorbed and the atoms are excited into a higher energy state. The atoms remain at the higher energy state for a very short time, and then release the absorbed energy. The wavelength of the released energy is at the same wavelength as that absorbed, and is directed in all directions. Since the oscillating monochromator 64 oscillates to periodically transmit the spectral wavelength of the element, the atomic fluorescence from the vapor will be intermittent or periodic at the same frequency as the oscillations.

A portion of the radiation from the atomic vapor, other than that of the beam 130, is directed through a filter 68 to a radiation sensitive detector 70. The filter 68 is a narrow band pass filter of the type described in FIG. 2 capable of passing at least the oscillating range of wavelengths passed by the monochromator 64. The signals generated by the radiation sensitive detector 70 are amplified by an AC amplifier 74 and applied to a synchronized detector 76. The synchronized detector 76 receives a reference signal from the oscillating monochromator 64 and applies a signal to an output device 78 which designates the presence and/or concentration of an element in the atomic vapor.

The radiation from the atomic vapor 66 received by the filter 68 includes flame emission radiation, scatter radiation due to particles in the atomic vapor, and modulated atomic fluorescence. The flame emission radiation appears as a DC signal and is rejected by the AC amplifier 74. The scatter radiation received by the filter 68 depends upon the number of particles in the atomic vapor and not upon the wavelength content of the beam 130.

In the conventional method of modulating a beam of radiation by an on-off chopping system, the scatter radiation is modulated at the same frequency as the radiation of interest and in phase with it. In the systems of FIGS. 3 and 8, the beam is wavelength modulated wherein the total amount of radiation is substantially constant with time and the scatter radiation, which is insensitive to wavelength, is also continuous with time. Accordingly, most of the scatter radiation, when detected, appears as a substantially direct current component, while the fluorescent radiation appears as an alternating current component and the associated electronic circuitry can readily distinguish between the two.

However, the number of radiation scattering particles in the vicinity of the atomic vapor is not constant with time. As a result, scattered radiation will also generate a small alternating current component, random in occurrence, superimposed on the larger direct current component. The detector 70, in effect, generates a desired alternating current signal having a known repetition rate and phase (oscillating rate) along with two components of unwanted signals consisting mostly of a direct current signal with a small intermittent alternating current signal component. Clearly, better signal separation can be achieved with this type of signal than in the conventional on-off modulation systems of the prior art when both the desired signal and unwanted signals are modulated in phase at the same frequency. The effect of unwanted scatter radiation appearing as an alternating current signal can be readily minimized in the apparatus of this application with the synchronous detector 76, while constant scatter radiation will be rejected by the AC amplifier 74. As a result, the effects of flame emission and scatter radiation are effectively rejected or minimized. The only prominent signal in the system is the atomic fluorescent radiation, which as previously mentioned, varies at the same rate as the frequency of oscillation of the monochromator 64. Accordingly, the system of FIG. 3 has a good signal-to-noise ratio for providing accurate results in measuring atomic fluorescence. The filter 68 may, for example, be a monochromator of FIGS. 2 and 6 wherein the filter 68 is coupled by the dashed-line 72 to the monochromator 64 so that the two monochromators will track.

In FIG. 8, the beam of radiation 130 from an oscillating mirror 120 in the monochromator 64 is directed through the exit slit 94 and is reflected by a mirror 98 through the flame zone of a burner 136. It is preferable for atomic fluorescent measurements that the outlet of the burner 136 has a circular shape rather than the elongated shape in the case of atomic absorption of FIGS. 6 and 7. The beam of radiation 130 reflected from the mirror 98 continues through the flame zone towards the light trap 132, as seen in FIG. 3. The mirror 102 of FIGS. 6 and 7 is removed and the entrance slit 104 of the filter monochromator 68 is positioned at an angle to the beam 130 so that the entrance slit 104 does not pass any direct radiation from the beam 130. Although the entrance slit 104 is illustrated to be positioned at an angle of 90°, it is to be understood, however, that it can be positioned at any angle as long as it does not receive the direct radiation of the beam 130. The radiation passing through the entrance slit 104 is reflected by a mirror 106 to the remainder of the monochromator as illustrated in FIG. 6.

Although the oscillating elements have been illustrated in figures as quartz plates and mirrors, it is to be understood, that the wavelength modulation can be achieved by other means to cause the atomic absorption or atomic fluorescence signal to be essentially the only prominent alternating current component present. For example, the entrance or exit slits of a monochromator could be oscillated. Alternatively, the dispersing devices, such as the gratings or prisms can be oscillated. Furthermore, the oscillating monochromator could have two entrance or exit slits and the beam switched from one slit to the other.

In each of the above-mentioned systems, the wavelength content of the output of the oscillating monochromator is varied to periodically include and exclude the wavelength of interest by scanning a dispersed beam of radiation with reference to an exit slit. Alternatively, the wavelength content of the beam of radiation from the monochromator can be varied to periodically remove the spectral or resonance line of interest from the beam. FIG. 9 is an illustration of a wavelength modulation means wherein an oscillating occluder periodically removes the resonance line from the beam.

In FIG. 9, a beam of radiation is directed through an entrance slit 140, reflected by a mirror 142 toward a dispersing device 144. The dispersed radiation is reflected by the mirrors 146 and 148 toward an oscillating occluder wavelength modulation system 150. The modulation system includes a U-shaped permanent magnet 152 including a pair of openings therethrough. One of the openings 154 functions as an exit slit. The other opening 156 merely provides a passage for the beam to the exit slit and should be large enough not to interfere with the function of the exit slit. The entrance slit 140 is made narrower than the exit slit 154.

A vibrating wire 158 is mounted taut between the supports 160 and 162. An oscillator 164 generates an alternating current which is caused to pass through the wire 158 to ground. The movement of current through the wire in the constant magnetic field causes the wire to vibrate in a plane normal to the lines of magnetic force and hence parallel to the plane of the exit slit 154. The wire 158 vibrates in a cyclic manner across at least the entire width of the exit slit 154 as in the directions indicated by the arrows 159 to obstruct passage of consecutive portions of the beam transmitted through the exit slit.

The thickness of the wire is selected to be just sufficient to occlude the image of the entrance slit 140 over a width in the order of a resonance line wavelength. The wire 158 can be of sufficient length with respect to the length of the exit slit 154 so that its movement, for practical purposes, can be considered linear. When the wire is oscillated transversely across the relatively wider exit slit 154, the wire will periodically block out the spectral line or absorbable radiation. At all other times it will block out only the unabsorbable radiation. Accordingly, it can be said that the beam of radiation transmitted by the apparatus of FIG. 9 is wavelength modulated to include and exclude the spectral line of the element tested. This type of wavelength modulation is applicable to any of the systems previously described in this application. Although electronic means for vibrating the wire are disclosed, it is to be understood, that other means, such as mechanical or electro-mechanical means can be readily substituted.

The amount of radiation transmitted through the atomic vapor with the occluder type modulator can be described as $$I = A - B - C - D + E \quad \text{(Equation 1)}$$

wherein:

I = total amount of radiation transmitted through the atomic vapor
A = total amount of radiation in the beam directed to the atomic vapor
B = radiation lost due to the occluder (wire)
C = radiation absorbed by the atomic vapor at the spectral line
D = band absorbance
E = emission radiation (band or line)

When the spectral line or absorbing radiation is occluded, the amount of radiation transmitted through the atomic vapor is $$I = A - B - D + E \quad \text{(Equation 2)}$$

The difference between these two signals is C.

Accordingly, the oscillating wire or occluder is another method for wavelength modulating the beam for measuring atomic absorption or fluorescence as previously described.

For the purpose of the following discussion, let us consider that the apparatus and methods described in FIGS. 1–9 effectively transmit two equal intensity bands of radiation through the atomic vapor to a photodetector, each band having different central frequencies, one of which includes the wavelength of the spectral line of the element tested. The detector receives the different radiation bands separately, in rapid sequence. In the absence of an element in the atomic vapor capable of absorbing radiation in one of the bands, the relative intensities of the radiation received by the detector from either band will be substantially equal and no AC signal will result. However, in the presence of an absorbing element in the atomic vapor, the wavelength of the spectral line in one of the bands will be absorbed and the total amount of radiation in that band will be reduced, while the amount of radiation in the other band will remain unchanged. The resulting signal from the detector in response to the alternate bands will then have an AC component the amplitude of which is a function of the concentration of the element in the atomic vapor.

The amplitude of the AC signal is equal to the difference in the amount of radiation received by the detector when the beam includes the wavelength of the spectral line of the element being tested (absorbing band) as compared to the amount of radiation received when the beam does not include the spectral line (non-absorbing band). It can be assumed that the intensity of beam received by the photodetector when the atomic vapor does not include the element tested is:

$$I_0 = X + Y \quad \text{(Equation 3)}$$

wherein:

$I_0$ = the intensity of the beam
X = the intensity of the beam due to the wavelength of the spectral line of interest
Y = the intensity of the beam due to the remainder of the wavelengths.

When the element tested is present in the application the intensity is:

$$I = X + Y - \Delta X \quad \text{Equation 4)}$$

wherein:

I = the intensity of the beam when the absorbing element is present
$\Delta X$ = the loss in intensity due to absorption at the spectral line Combining Equations 3 and 4 we have:

$$\Delta X = I_0 - I \quad \text{(Equation 5)}$$

According to the Beer-Lambert equation:

$$A = abc = -\log \frac{I}{I_0} \quad \text{(Equation 6)}$$

wherein:

A equals absorbance
a = extinction coefficient
b = path length
c = concentration $$I = I_0 10^{-abc} \quad \text{(Equation 7)}$$

therefore:

$$\Delta X = I_0(1 - 10^{-abc}) \quad \text{(Equation 8)}$$

This can be expanded into the series:

$$\Delta X / I_0 = abc - \frac{(abc)^2}{2!} + \frac{(abc)^3}{3!} - \cdots \quad \text{(Equation 9)}$$

From this series it can be seen that the output signal $\Delta X$ is directly proportional to the input signal and therefore can be magnified by any gain increase mechanism. $\Delta X$ is also directly proportional to the concentration at all values where the squared term is insignificant. The equations and treatment set forth is also applicable for fluorescence measurements.

What is claimed is:

1. Apparatus for measuring the amount of radiation adsorbed by an element in a substance, comprising:
   a source of radiation for emitting a substantially continuous range of wavelengths;
   means for converting the substance into an atomic vapor;
   means for directing a beam of radiation from said source through said atomic vapor;
   first means disposed for receiving said beam before it passes through said atomic vapor, said first means exhibiting a relatively narrow band pass for transmitting a beam of radiation having a wavelength band width that is narrow compared to the range of wavelengths emitted by said source but wide compared to a spectral line of an element;
   second means for periodically varying the wavelength content within the beam transmitted by said first means at a rapid rate to periodically include and exclude the wavelength of the spectral line of said element, and
   detection means arranged so that it is irradiated by said beam after it passes through the atomic vapor and said firts means for generating a signal corresponding to the amount of radiation absorbed by said atomic vapor.

2. The apparatus as defined in claim 1, further comprising:
   optical means disposed for receiving said beam after it passes through said atomic vapor for substantially eliminating from said beam wavelengths other than those transmitted by said first means.

3. Apparatus as defined in claim 1, wherein:
   said first means disperses said beam of radiation in accordance with wavelengths and transmits a portion of said dispersed wavelengths having a limited wavelength content that includes the spectral line of said element tested and excludes interfering spectral lines, and
   said second means includes an oscillating occluder that is narrow compared to the physical dimension of the beam of radiation transmitted by said first means and that periodically sweeps the beam to exclude wavelength portions thereof.

4. Apparatus as defined in claim 1, wherein:
said first means includes dispersing means for dispersing said beam of radiation in accordance with wavelengths and transmits a small portion of said dispersed wavelengths;
said second means periodically varies the portion of the dispersed wavelength transmitted by first means over a range to vary the wavelength content of the transmitted beam to periodically include and exclude the wavelength of the spectral line of said element tested, but limited in the range of wavelengths transmitted to exclude interfering spectral lines.

5. The apparatus as defined in claim 1, wherein:
said second means for periodically varying continuously varies the wavelengths in said narrow band width in a sinusoidal manner.

6. The apparatus as defined in claim 1, wherein:
said second means for periodically varying, varies the wavelengths in said narrow band width in discrete steps to alternately include and exclude the spectral line of the element tested.

7. Apparatus for measuring the concentration of an element in a substance, comprising:
a source of radiation for emitting a substantially continuous range of wavelengths;
means for converting the substance into atomic vapor for said atomic vapor to emit and absorb radiation of the wavelength of the atomic spectral line characteristic of said element;
means for directing a beam of radiation from said source through said atomic vapor;
variable wavelength filter means disposed for receiving said beam before it passes through said atomic vapor, said filter means exhibiting a relatively narrow band pass compared to the range of wavelengths emitted by said source for passing a narrow band of wavelengths;
detection means disposed for irradiation by said beam after said beam passes through the atomic vapor;
means for periodically varying the wavelength content of said narrow band of wavelengths over a small range to periodically include and exclude the wavelength of the spectral line characteristic of said element to the exclusion of other interfering spectral lines whereby said detection means generates a periodic signal corresponding to the amount of radiation absorbed by said atomic vapor, and
means responsive to said periodic signal for providing a signal corresponding to the concentration of said element.

8. The apparatus as defined in claim 7, further comprising:
optical means disposed for receiving said beam after it passes through said atomic vapor for substantially eliminating from said beam wavelengths other than said small range of wavelengths.

9. The apparatus as defined in claim 8 wherein:
said variable filter means comprises means for dispersing the radiation received in accordance to its wavelengths, and slit means for receiving said dispersed radiation for selecting a portion of the wavelengths to be passed thereby defining said narrow band of wavelengths.

10. The apparatus as defined in claim 9 wherein:
said means for periodically varying the wavelength passed by said filter means comprises a periodically scanning mirror for directing radiation from said dispersing means toward said slit means.

11. The apparatus as defined in claim 9 wherein:
said means for periodically varying the wavelength passed by said filter means comprises a transparent plane parallel plate for varying the wavelengths directed through the slit means.

12. Apparatus for measuring the concentration of a predetermined element in a substance comprising:
a continuum source of radiation;
means for converting said substance into an atomic vapor;
first optical means for directing a beam of radiation from said source through said atomic vapor;
second optical means including an entrance for receiving said beam before it passes through said atomic vapor and further including means for dispersing said beam on an exit slit in accordance with wavelength for transmitting a beam of radiation including a range of wavelengths that is small compared to the range of said continuum source;
means for periodically varying the wavelength content of said beam transmitted by said second optical means to periodically include and exclude the spectral line characteristic of the element measured;
radiation sensitive means for receiving said beam transmitted said atomic vapor and said second optical means for generating an electrical signal corresponding to the amount of radiation received, and
circuit means coupled to said radiation sensitive means for generating a signal corresponding to the concentration of the element in said substance.

13. Apparatus as defined in claim 12, further including:
third optical means disposed for receiving said beam after said beam passes through said atomic vapor, said third optical means including an entrance for receiving said beam and means for dispersing said beam on an exit slit in accordance with wavelength and means for substantially eliminating from said beam wavelengths other than the wavelengths transmitted by said second optical means.

14. Apparatus as defined in claim 12, wherein:
said means for periodically varying the wavelength content of said transmitted beam includes an oscillating occluder that is narrow compared to the exit slit of said second optical means and that periodically scans across the exit slit to periodically exclude portions of the dispersed wavelengths transmitted through the exit slit.

15. Apparatus as defined in claim 13, wherein:
said means for periodically varying the wavelength content of said transmitted beam includes means for scanning said dispersed beam across said exit slit over a range to include and exclude the wavelength of the spectral line of the element tested, said last mentioned range limited to exclude interfering spectral lines.

16. Apparatus as defined in claim 13, wherein:
the dispersing means of said second and third means are mechanically coupled together for movement in unison.

17. Apparatus for determining the amount of radiation absorbed by a predetermined element in an atomic vapor, comprising:
a source of radiation for emitting radiation over a substantially continuous spectrum of wavelengths including the wavelengths of the spectral line characteristic of many elements;
means for providing an atomic vapor including the predetermined element to be tested;
a monochromator including an entrance slit for receiving a beam of radiation and dispersing means for dispersing said beam on an exit slit to pass a range of wavelengths that is small compared to the spectrum of said source thereby defining band width of a beam passed by said monochromator, said dispersing means is adjustable to control the wavelengths within said range;
radiation sensitive means responsive to radiation applied thereto for generating an electrical signal;
filter means having a band pass that is small compared to the spectrum of wavelength emitted by said source but larger than the band width of the beam passed by said monochromator;
means for directing a beam of radiation through said monochromator, said atomic vapor and said optical filter means to said radiation sensitive means in that order, and means for varying the wavelength content within said band width of the beam passed by said monochromator in a cyclic manner within the band pass of said filter means to periodically pass the spectral line characteristic of the element tested for generation by said radiation sensitive means of a signal corresponding to the amount of radiation absorbed by the element in said atomic vapor.

18. Apparatus as defined in claim 17, wherein:

said filter means includes an entrance slit for receiving said beam of radiation and dispersing means for dispersing said beam on an exit slit thereby defining the band pass of said filter means, said dispersing means is adjustable to control the wavelengths within said band pass, and said dispersing means of said filter means is mechanically coupled to said dispersing means of said monochromator for cooperative movement.

19. Apparatus for determining the concentration of a predetermined element in a substance comprising:

means for converting said substance into an atomic vapor which absorbs spectral line radiation;

means for alternately directing two bands of wavelengths of substantially equal energy level comprising a single beam of radiation through said atomic vapor, one of said bands including the spectral line wavelength of the element in said atomic vapor, so that the amount of radiation that passes through the atomic vapor in the band including the spectral line is reduced compared to the other band as a function of the amount of spectral line radiation absorbed;

filter means for receiving the beam of radiation after it passes through said atomic vapor for substantially eliminating from said beam, wavelengths other than said two bands of wavelengths;

radiation sensitive means for receiving said beam of radiation after it passes through said atomic source for generating an electrical signal corresponding to the amount of radiation received, and circuit means coupled to said radiation sensitive means for eliminating the effect of radiation emitted by said atomic vapor and for providing a signal indicating the concentration of the element.

20. The combination comprising:

means for converting a substance into an atomic vapor;

a source of radiation for emitting a substantially continuous wide range of wavelengths defined as a first range of wavelengths;

an adjustable monochromator positioned to receive said first range of wavelengths and to transmit toward said atomic vapor a second range of wavelengths substantially smaller than said first range but larger than the spectral line characteristic of an element tested said monochromator is adjustable over a fourth range of wavelengths substantially wider than said second range for selecting the portion of said first range to be transmitted as said second range;

means coupled to said monochromator for rapidly varying the wavelengths within said second range over a third range so that said second range periodically includes the spectral line characteristic of said element, the third range being substantially less wide than said fourth range;

radiation sensitive means for generating an electrical signal in response to radiation applied thereto;

a second adjustable monochromator positioned to receive radiation from said atomic vapor and to transmit a fifth range of wavelengths to said radiation sensitive means, said fifth range of wavelengths is at least as wide as said third range, said second monochromator is adjustable over a range of wavelengths in the order of the width of said fourth range;

means for coupling said first and second monochromators together to be adjusted in unison so that the wavelengths in said fifth range include those in the third range, and circuit means coupled to said radiation sensitive means for providing a signal that is a function of the amount of the element present in said atomic vapor.

21. The combination as defined in claim 20, wherein:

said second monochromator is positioned to receive the radiation transmitted by said first monochromator through said atomic vapor, and said circuit means provides a signal corresponding to the amount of radiation absorbed by said atomic vapor at the spectral line characteristic of the element being tested.

22. The combination as defined in claim 20, wherein:

said second monochromator is positioned to receive radiation from said atomic vapor to the exclusion of the radiation transmitted through said atomic vapor by said first monochromator, and said circuit means provide a signal corresponding to the amount of atomic fluorescence emitted by said atomic vapor at the wavelength of the spectral line characteristic of the element being tested.

23. Apparatus for determining the concentration of a predetermined element in an atomic vapor, comprising:

first means for directing a wavelength modulated beam of radiation towards said atomic vapor, said beam of radiation periodically oscillates over a small range of wavelengths to periodically include the spectral line characteristic of the element tested;

radiation sensitive means for generating an electrical signal in response to radiation applied thereto;

second means positioned to receive radiation from said atomic vapor for transmitting to said radiation sensitive means a band of wavelengths corresponding to the wavelengths transmitted by said first means and excluding other wavelengths received from said atomic vapor, and circuit means coupled to said radiation sensitive means for developing a signal corresponding to the concentration of the element being tested in said atomic vapor.

24. Apparatus as defined in claim 23, wherein:

said second means receives said beam transmitted by said first means through said atomic vapor, and said circuit means generates a signal corresponding to the amount of radiation absorbed by said atomic vapor at said spectral line.

25. Apparatus as defined in claim 23, wherein:

said second means receives from said atomic vapor radiation other than said beam transmitted through said atomic vapor by said first means, and said circuit means generates a signal corresponding to the amount of atomic fluorescence emitted by said atomic vapor at said spectral line.

26. Apparatus determining the presence of a predetermined element in an atomic vapor having a spectral line characteristic, comprising:

a source of radiation providing a substantially continuous wide range of wavelengths including wavelengths of spectral lines of many elements;

first means positioned to receive radiation from said source of radiation for transmitting a preset band of wavelengths which band is narrow compared to the range of said source and wide compared to the spectral line of the predetermined element, said first means is adjustable over a range of wavelengths including the spectral lines of many elements to select the portion of the wavelength range of said source to be transmitted within said preset narrow band;

second means for periodically oscillating the wavelengths within said transmitted band of said first means to provide a wavelength modulated output, the range of oscillations being small compared to the adjustable range of said variable filter means and the total range of oscillating wavelengths being limited to include only the spectral line characteristic of the predetermined element;

third means positioned to receive from said atomic vapor radiation other than said beam transmitted through said atomic vapor by said first means for passing a range of wavelengths in the order of said range of oscillating wavelengths and substantially excluding other wavelengths;

radiation sensitive means for producing an electrical signal in response to radiation applied thereto receiving radiation transmitted by said second means, and circuit means coupled to said radiation sensitive means to provide a signal that corresponds to the amount of atomic fluorescence emitted by said atomic vapor.

27. A method of measuring the concentration of a predetermined element in a substance, comprising the steps of:

converting said substance into an atomic vapor for emitting and absorbing radiation of the wavelengths of the spectral lines of the elements therein;

directing a wavelength modulated beam of radiation through said atomic vapor periodically including and excluding the wavelength of the spectral line of the element tested and continuously excluding any wavelengths of interfering spectral lines;

filtering the beam of radiation after it passes through the atomic vapor substantially excluding radiation wavelengths from said atomic vapor other than the wavelengths of said wavelength modulated beam of radiation, and measuring the difference between the intensity of the filtered modulated beam when the filtered beam includes the spectral line of the element tested and when the filtered beam does not include said spectral line, which difference is determinative of the concentration of said element.

References Cited

UNITED STATES PATENTS

| | | | |
|---|---|---|---|
| 2,847,899 | 8/1958 | Walsh | 356—87 |
| 3,406,308 | 10/1968 | Yamasaki | 356—87 |
| 3,430,864 | 3/1969 | Miller et al. | 356—87 |
| 3,460,892 | 8/1969 | Dolin | 356—83 |
| 3,469,923 | 9/1969 | Mertz | 356—106 |

RONALD L. WIBERT, Primary Examiner

V. P. McGRAW, Assistant Examiner

U.S. Cl. X.R.

250—226; 356—88, 100

UNITED STATES PATENT OFFICE
CERTIFICATE OF CORRECTION

Patent No. 3,565,567         Dated February 23, 1971

Inventor(s) Stephen D. Rains

It is certified that error appears in the above-identified patent and that said Letters Patent are hereby corrected as shown below:

Column 14, line 18, before "said", first occurrence,
          insert -- through --

Column 15, line 57, after "tested" insert a comma (,)

Signed and sealed this 7th day of September 1971.

(SEAL)
Attest:

EDWARD M. FLETCHER, JR.          ROBERT GOTTSCHALK
Attesting Officer                Acting Commissioner of Pat